(12) United States Patent
Spratt

(10) Patent No.: US 7,026,983 B2
(45) Date of Patent: Apr. 11, 2006

(54) LOCATION DATA DIFFUSION AND LOCATION DISCOVERY

(75) Inventor: Michael P. Spratt, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 09/905,774

(22) Filed: Jul. 13, 2001

(65) Prior Publication Data

US 2002/0045455 A1 Apr. 18, 2002

(30) Foreign Application Priority Data

Jul. 18, 2000 (GB) .................................... 0017456
Nov. 9, 2000 (GB) .................................... 0027384
Jan. 31, 2001 (GB) .................................... 0102417
Jun. 11, 2001 (GB) .................................... 0114144

(51) Int. Cl.
*H04B 7/185* (2006.01)

(52) U.S. Cl. .................. 342/357.09; 342/357.08; 342/357.1; 342/457; 342/458; 342/463; 342/464; 455/41.2; 455/404.2; 455/456.1

(58) Field of Classification Search ............. 455/41.2, 455/11.1, 7, 456.1, 404.2, 518, 519, 41.3; 342/357.08, 357.09, 357.1, 457, 458, 463, 342/464
See application file for complete search history.

(56) References Cited

U.S. PATENT DOCUMENTS

| | | | |
|---|---|---|---|
| 5,375,161 A | 12/1994 | Fuller et al. ................ 379/57 |
| 5,428,544 A | 6/1995 | Shyu ....................... 364/436 |
| 5,652,570 A | 7/1997 | Lepkofker ................. 340/573 |
| 5,787,359 A | 7/1998 | Nagata ..................... 455/517 |
| 5,875,400 A | 2/1999 | Madhavapeddy et al. ... 455/458 |
| 6,047,183 A | 4/2000 | Kingdon et al. ............ 455/440 |
| 6,078,818 A * | 6/2000 | Kingdon et al. ........ 455/456.5 |
| 6,078,826 A | 6/2000 | Croft et al. ................. 455/574 |
| 6,167,276 A * | 12/2000 | Pite ....................... 455/456.3 |
| 6,236,335 B1 | 5/2001 | Goodwin, III ......... 340/825.49 |
| 6,275,707 B1 * | 8/2001 | Reed et al. .............. 455/456.3 |
| 6,327,533 B1 * | 12/2001 | Chou ......................... 701/207 |
| 6,477,353 B1 * | 11/2002 | Honda et al. .............. 455/11.1 |
| 6,549,625 B1 | 4/2003 | Rautila et al. .............. 380/258 |

FOREIGN PATENT DOCUMENTS

DE 199 03 909 8/2000
EP 0 913 965 A1 5/1999

(Continued)

OTHER PUBLICATIONS

U.S. Appl. No. 09/905,775, filed Jul. 13, 2001, Spratt.

(Continued)

*Primary Examiner*—Nay Maung
*Assistant Examiner*—Raymond Dean

(57) ABSTRACT

A location discovery method using location data items that originate at known locations (X,Y) and are passed to, and diffused between, entities (A,B) by short-range communication. Each location data item received by an entity (A,B) indicates a maximum distance of the entity from one of the known locations (X,Y). Each entity (A,B) prior to using a location data item for location determination or transferring it to another entity, is operative to increase the maximum distance indicated by the location data item to take account of movement of the mobile entity since receiving that item. A mobile entity (A) effects location determination by finding locations (40) simultaneously consistent with the maximum distances (31,36) it knows of and any applicable route constraints for how the location data items passed to the mobile entity.

83 Claims, 7 Drawing Sheets

FOREIGN PATENT DOCUMENTS

| | | |
|---|---|---|
| EP | 0 948 222 A2 | 10/1999 |
| EP | 1 133 115 A2 | 9/2001 |
| GB | 2 338 374 A | 12/1999 |
| GB | 2 339 356 | 1/2000 |
| GB | 2 342 018 A | 3/2000 |
| GB | 2 344 723 A | 6/2000 |
| GB | 2 360 914 A | 10/2001 |
| GB | 2 364 203 A | 1/2002 |
| WO | 99/46899 | 9/1999 |
| WO | 99/65152 | 12/1999 |
| WO | 01/50151 A1 | 7/2001 |

OTHER PUBLICATIONS

U.S. Appl. No. 10/057,741, filed Jan. 23, 2002, Spratt.

U.S. Appl. No. 10/057,742, filed Jan. 23, 2002, Spratt.

Bandyopadhyay, S., et al., "Using Mobile Agents for Off-Line Communication Among Mobile Hosts in a Large, Highly-Mobile Dynamic Networks," *IEEE International Conference on Personal Wireless Communications Proceedings*, pp 88-92 (Feb. 17, 1999).

\* cited by examiner

LOCATION DATA DIFFUSION AND LOCATION DISCOVERY

CROSS REFERENCE TO RELATED APPLICATIONS

The subject matter of the present application may also be related to the following U.S. Patent Applications: "Location Data Validation by Static Entities Receiving Location Data Items by Short-Range Communication," Ser. No. 10/057,741, filed Jan. 23, 2002; "Message Passing to a Known Location," Ser. No. 09/905,775, filed Jul. 13, 2001; and "Location Data Dissemination and Reception for Entities Having Short-Range Receivers," Ser. No. 10/057,742, filed Jan. 23, 2002.

FIELD OF THE INVENTION

The present invention relates to the diffusion of location data by entities equipped with short-range communication devices and to the use of such data for effecting location discovery

BACKGROUND OF THE INVENTION

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

One possible use for such short-range technologies is the transmission of local information to passers-by equipped with mobile devices having short-range transceivers, the local information being, for example, transmitted by a shop to inform the passers-by of current promotions. Another use is in location beacons that transmit location information to passers-by.

It is known, for example from EP-A-0,948,222, to diffuse information amongst users by short range wireless links so that a user need not be in range of an originating transmitter in order to receive the information sent out by the latter. Such an arrangement is likely to be particularly useful in environments such as shopping malls, city centers, tourist attractions, theme parks or any other location where large numbers of users carrying mobile devices with short-range transceivers are likely to be in one locality. Another important area of application is the diffusion of information between devices fixed in cars.

FIG. 1 of the accompanying drawings depicts an information diffusion process in which an originating information point 10 (typically fixed, but not necessarily so) sends out the information over a short-range radio link to nearby mobile devices, in this case device 11. The receiving device 11 transmits on the information to a neighboring device 12 and then moves (see dashed arrow in FIG. 1) before sending on the information again to another device 14. Meanwhile mobile device 12 has moved into proximity with device 13 to which it also transmit the information. Device 13 now moves near to the device 14 and passes the latter the information—however, as device 14 already has the information from device 11, it ignores the copy from device 13. Device 13 also passes the information to a fixed relay transceiver which subsequently passes the information to a mobile device 15. Finally, device 15 passes the information to device 14 which has now within range of device 15; again, device 14 ignores the copy information from device 15.

It can be seen that information can be rapidly diffused among the population of mobile-device users in the general vicinity of the source 10. So, the process of diffusion takes advantage of both the short range wireless technology and the movement of the users carrying the devices.

By applying appropriate diffusion-limiting mechanisms (for example, by assigning the original information a total time to live of, for example, 10 minutes), the information will generally only be diffused in the vicinity of the originating point 10. This makes the diffusion process appropriate for the diffusion of location relevant information that is primarily of use only in the vicinity of point 10.

The advantages of using short-range diffusion over sending data on a cellular network such as GSM, are avoidance of the cellular charges, and the availability of much higher bit rates.

The diffused information can, of course, include the location of the originating point. For devices receiving the information directly from the originating point, this provides them with a fairly accurate indication of their location (because the information is received over a short-range link). However, as the information is diffused between devices, the newly-receiving devices get less and less accurate location information.

It is an object of the present invention to provide a location discovery means using the diffusion of location information that is more general in application.

SUMMARY OF THE INVENTION

According to the present invention, there is provided a method of disseminating location information wherein location data items originating at known locations are passed to, and diffused between, entities by short-range communication, each location data item including a distance-related quantity indicative of an upper bound value for the distance travelled by the location data item from a specified said known location, said entities updating the distance-related quantities of location data items they handle to take account of perceived travel of these location data items.

Location data items can travel either by being carried by an entity or by transmission between entities. Accordingly, the distance-related quantity of a location data item is preferably increased both by an amount corresponding to the distance moved by an entity storing it, and, for each transmission hop between two entities, by an amount related to the transmission range of the transmitting entity. Of course, for static entities, the first of these amounts is not applicable, whereas for fast moving entities, the second amount can generally be ignored.

The location data items held by an entity are advantageously used by the entity to determine its location by determining a location simultaneously consistent, or most nearly consistent, with the upper bound distances it knows of as a result of location data items it has received. In effecting this determination, the entity may apply one or more route constraints for how the location data items passed to the mobile entity.

In one embodiment, the entity is a vehicle equipped with a short-range transceiver and an odometer, the vehicle increasing the upper bound distances of its location data items by the distance travelled by the vehicle as indicated by the odometer. In another embodiment, the entity is a pedestrian carrying a mobile device with a short-range transceiver, the device effecting an estimate of the maximum distance likely to have been travelled by the pedestrian based on a speed value and elapsed time, and the device increasing the upper bound distances of its location data items by the estimate of the maximum distance likely to have been travelled by the pedestrian.

According to another aspect of the present invention, there is provided a location discovery method in which an entity:
- receives location data items from currently-nearby transmitting entities, each location data item including a distance-related quantity indicative of an upper bound distance to a specified known location;
- maintains the received location data items by updating the distance-related quantity of each location data item to take account of perceived travel of the location data items; and
- effects location determination by determining what locations are simultaneously consistent, or most nearly consistent, with the upper bound distances known to the entity.

The present invention also encompasses entities embodying the foregoing methods.

BRIEF DESCRIPTION OF THE DRAWINGS

Location diffusion and discovery methods and entities implementing these methods, all embodying the invention, will now be described, by way of non-limiting example, with reference to the accompanying diagrammatic drawings, in which.

BEST MODE OF CARRYING OUT THE INVENTION

Figure 1:
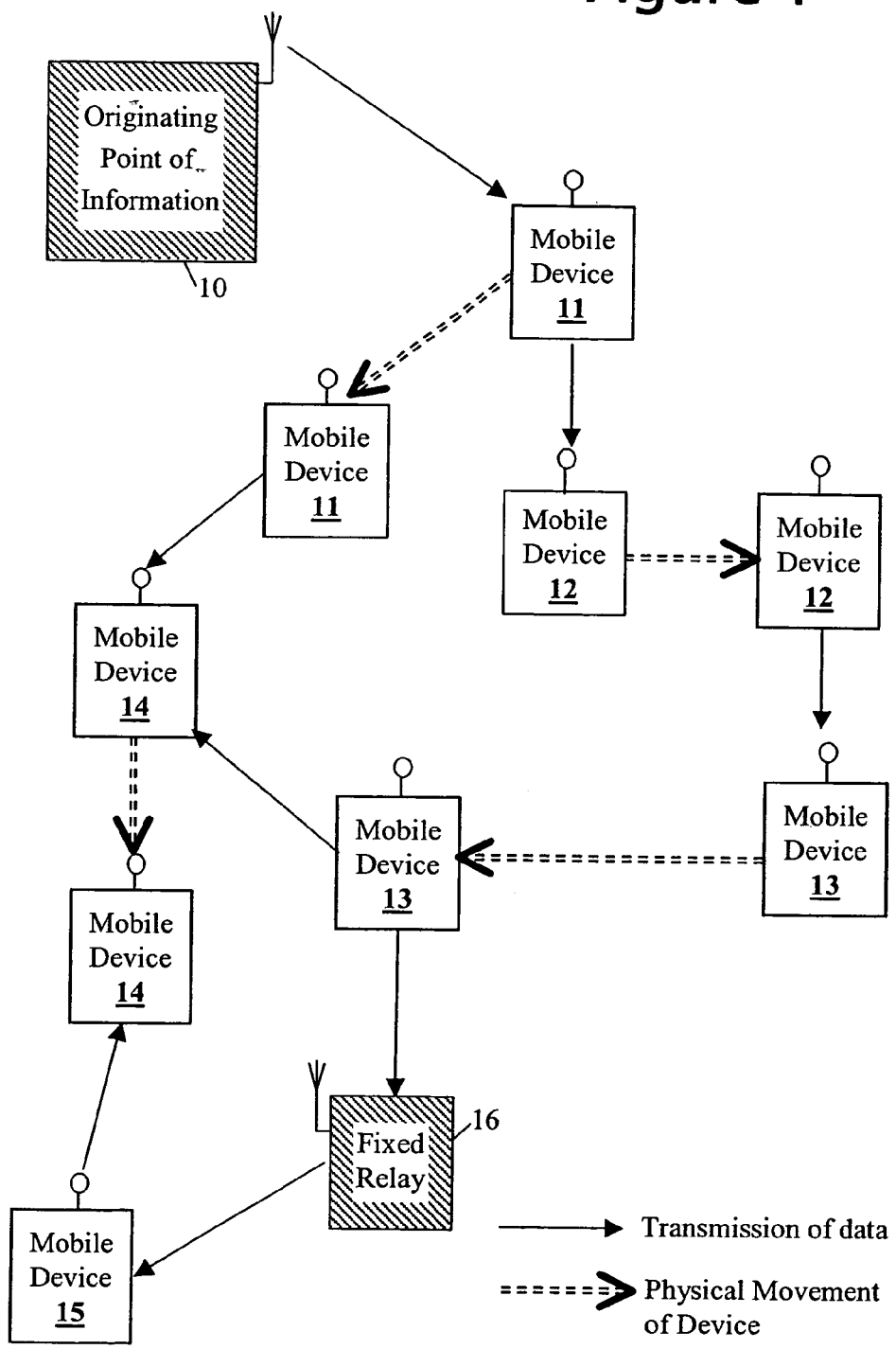
FIG. 1 is a diagram illustrating an information diffusion technique.
Figure 2:
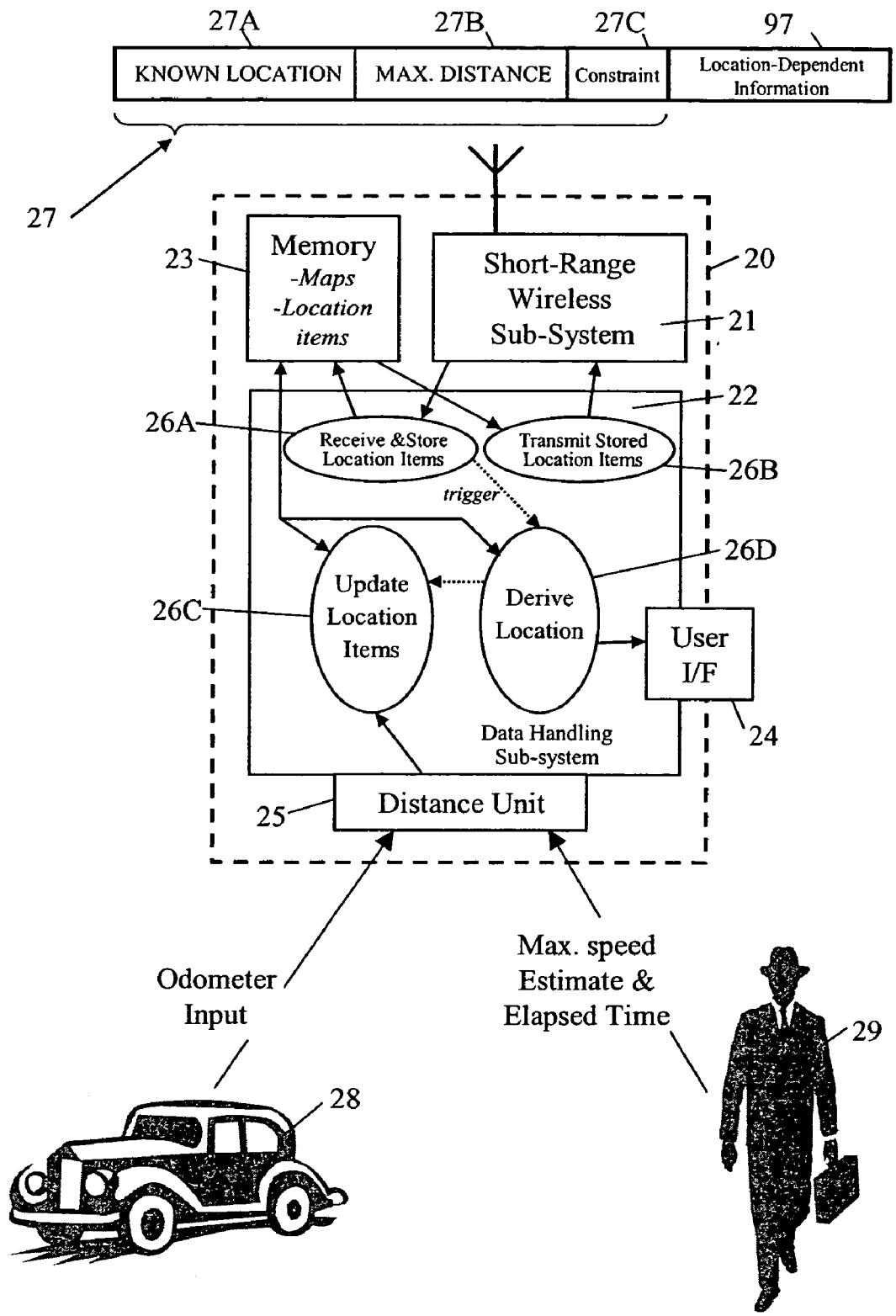
FIG. 2 is a diagram illustrating the main elements of a mobile entity embodying the present invention both for vehicle-carried and pedestrian-carried implementations.

FIG. 2 shows the main elements of a generalized mobile entity 20 embodying the present invention. As will be seen below, specific implementations of the generalized mobile entity include a vehicle-based implementation and a pedestrian-based implementation—in the former case, the functional elements can be built into the vehicle whereas in the latter case, the elements will generally be provided in the form of a mobile device carried by the pedestrian.

The functional elements of the mobile entity 20 comprise:
- a short-range wireless transceiver subsystem 21 (for example, infrared-based or, preferably, radio-based such as a Bluetooth system) for receiving and transmitting location data items 27 from/to nearby mobile entities of similar form;
- a data-handling subsystem 22 for handling and maintaining the location data items 27 and effecting location determinations;
- a memory 23 for stored map data and also location data items received via the wireless subsystem 21 and the data-handling subsystem 22;
- a user interface for a displaying a map-based indication of location to the user; and
- a distance unit 25 for providing a measure of incremental distance traveled, to the data-handling subsystem 22 to enable the latter to maintain the location data items held in memory 23.

The data-handling subsystem runs four main processes, these being a process 26A for receiving and storing location data items; a process 26B for controlling the onward transmission of location data items whenever the wireless subsystem 21 determines that there is another mobile entity close by; a process 26C for updating the stored location data items to take account of the incremental distance traveled by the mobile entity according to the distance unit 25; and a process 26D for effecting location determination based on the received location data items and the map data held in memory 23, and for outputting the results of the determination to user interface 24.

With respect to the distance unit 25, where the mobile entity is vehicle based (see vehicle 28), the unit 25 can conveniently be constituted by the vehicle's existing odometer; for pedestrian-based implementations (see pedestrian 29), the distance unit 25 is preferably a process run by the data handling subsystem 22 to provide an estimate of distance travelled based on the product of elapsed time (since last update or message receipt) and a maximum speed value set or measured for the pedestrian.

Each location data item comprises two main fields 27A and 27B. Field 27A holds an identifier of a known location, either as a label which can be used to look up the location (for example, using the map data held in memory 23), or directly as location coordinates for the location. Field 27B holds a distance quantity which, as will be more fully explained below, corresponds to the maximum distance to the known location identified by field 27A. The location data item may also include a field 27C indicating an applicable constraint type as will be explained below. Each location data item originates from a short-range transmission source located at the known location specified in the data item; when transmitted from this source, the distance quantity is zero valued and, indeed, the location data item transmitted from the source may be reduced to simply comprise the location identity.

Each location data item may be transmitted as the sole content of a message or may be included with other message content such as location-dependent information 97.

The purpose of the update process 26C is to update the distance quantity held in field 27B of each location data item by adding to it the incremental distance travelled by the mobile entity since the last update or, for newly received items, since received. Whilst it is only necessary to update the distance quantities held in fields 27B immediately prior to the data items either being used in the location determination process 26D or being onwardly transmitted, in practice it may be more convenient to continuously update the distance quantities.

As a result of this updating, the distance quantity of each location data item 27 indicates the total distance travelled by the mobile entity or entities that have participated in carrying the location data item away from the original transmission source of the data item. Since some of the distance travelled may not have been away from the source, the distance quantity effectively represents the maximum distance (that is, an upper bound distance) from the known location identified in the data item to the mobile entity currently holding the location data item. It should, however, be noted that since the distance quantity maybe derived by estimations, it does not necessarily represent a true upper bound distance but simply an estimated one.

Figure 9:
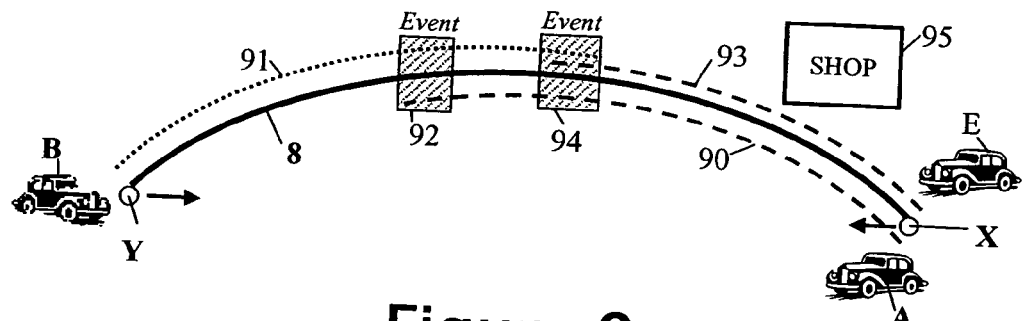
FIG. 9 is a diagram of another map known to vehicle B, and illustrating a process for determining the display of information about upcoming facilities.
Figure 10:
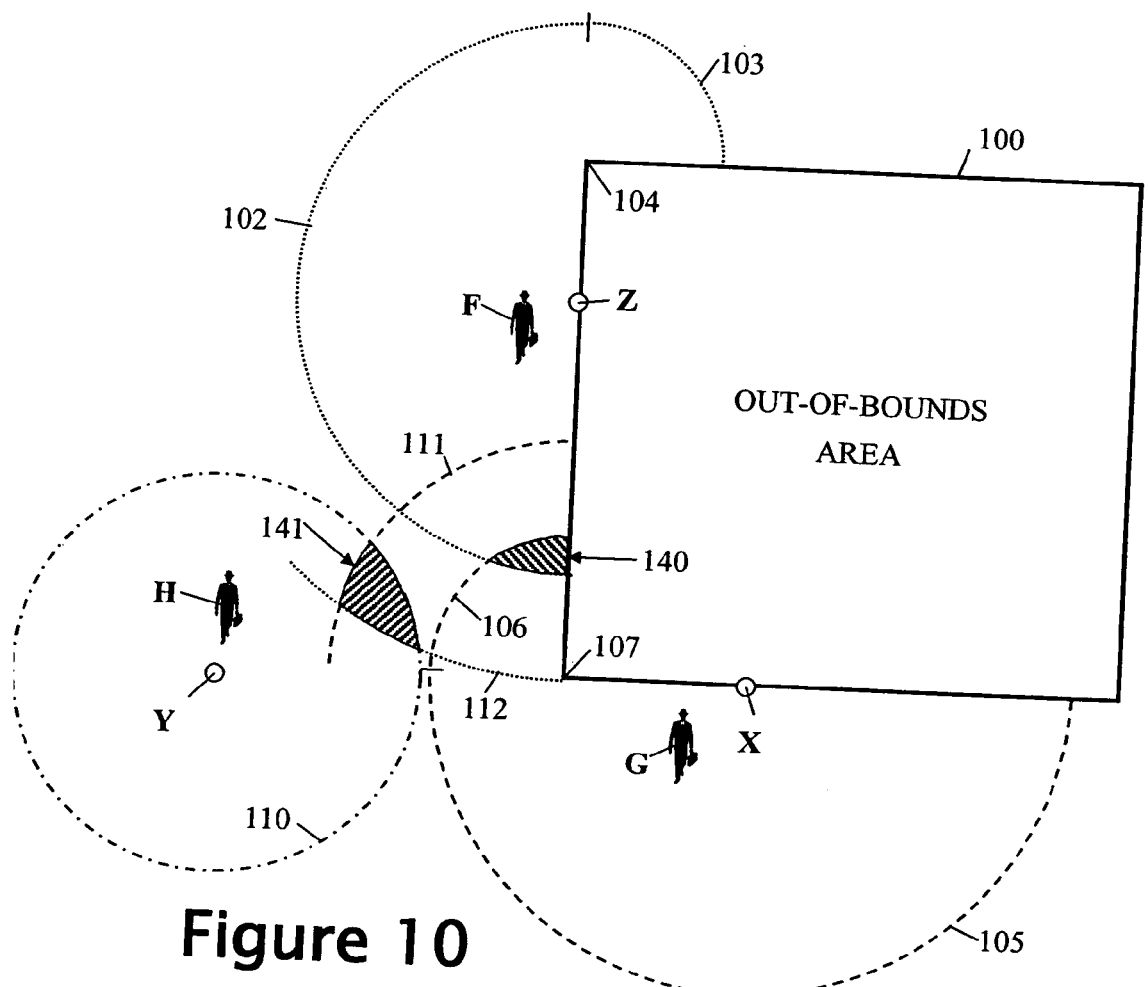
FIG. 10 is a diagram illustrating location discovery for a pedestrian-based mobile entity of the FIG. 2 form.
Figure 11:
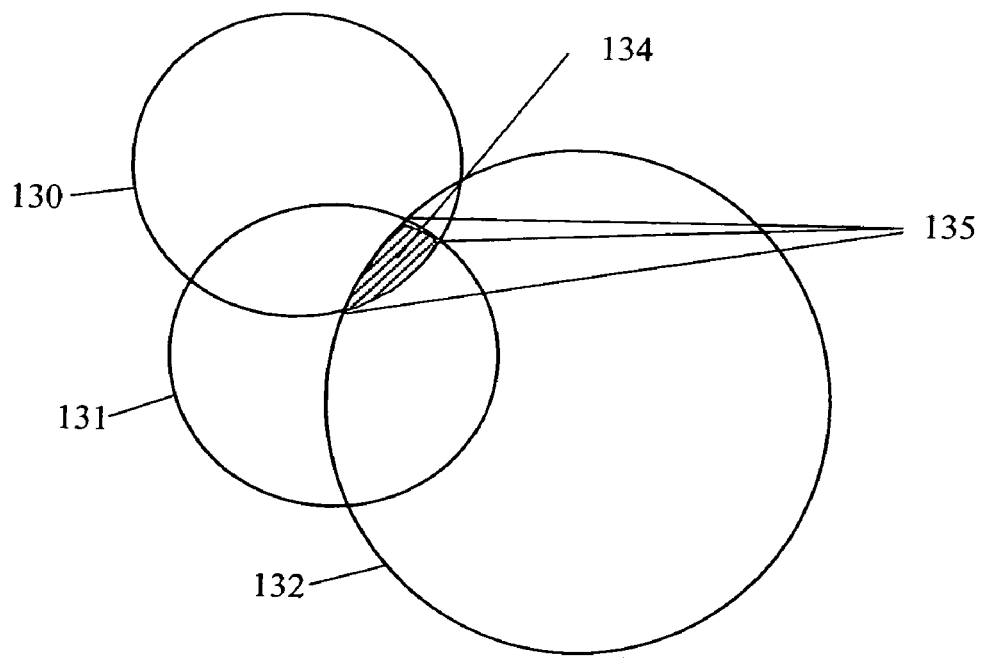
FIG. 11 is a diagram illustrating one method of determining a best estimate of location from an area of possible locations.

The general operation of the mobile entity and details of how location determination is effected by the mobile entity will now be described, first for a vehicle-based embodiment (FIGS. 3 to 9) and then for a pedestrian-based embodiment (FIGS. 10, 11). In the following description, all elements that include short range communication means have been identified by a capital letter A to Z with the elements X, Y and Z being used for transmission sources of location data items (that is, sources located at known locations), and the other elements being mobile entities of the general form shown in FIG. 2.

Vehicle Location (FIGS. 3 to 9)

In the following scenarios, it is assumed that vehicles A, B, C, D are equipped as FIG. 2 mobile entities with the vehicle odometers being used as the distance units 25. It is also assumed that every few miles a vehicle will encounter a short-range transmission source X, Z or Z sending out a location data item (which as already noted, can simply be a location identifier). It is further assumed that the map data held by the vehicles A to D hold the locations of the sources X, Y, Z.

The change in odometer reading ("Milometer Advance") between two points will be represented below in the form:

MA(first point, second point)

Also, the distance between two points along a permitted route (e.g. road) known to a vehicle through its map data, will be referred to as the 'road distance' ("RD") and will be represented as:

RD(first point, second point)

Of course, there will in general be multiple paths through the meshed road network represented by the map data between two points; in other words, starting from the first point, there will be multiple routes to reach the second point. The distance RD between two points which is the minimum distance that can be traveled along roads on the map to get from one point to the other (or vice versa) will be referred to as the Minimum Route Distance "MRD". Obviously, MRD will very often be greater than the distance 'as the crow flies' between the two point concerned. For convenience, the map route(s) taken between two points which minimize the distance are referred to below as 'minimum route(s)'.

To identify specific location data items 27 ("LD"), the following convention will be used:

LD(source point; first carrying mobile entity, second carrying mobile entity, . . . )

so that a location data item source from transmission point X and carried by vehicle A and then vehicle B will be identified as LD(X;A,B)

Figure 3:
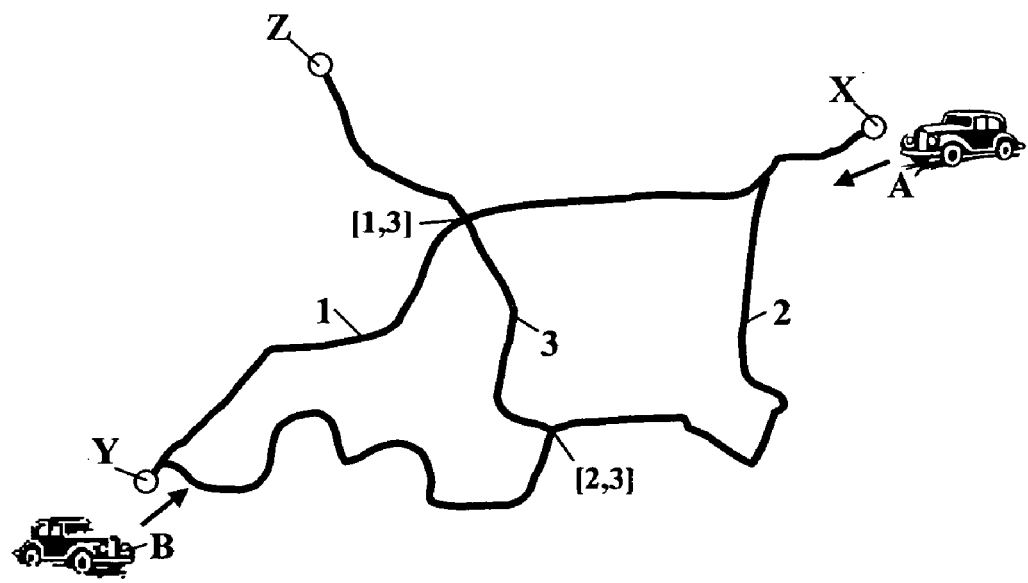
FIG. 3 is a diagram of a map known to a vehicle-based mobile entity A of the FIG. 2 form, the map showing originating points for location data items, and roads from these points.

FIG. 3 represents a first map known to vehicle A. The map shows roads 1 and 2 extending between location-data-item source points X and Y, with the minimum route being road 1—thus, MRD(X,Y) is the distance along road 1. A third road 3 from source point Z intersects road 1 at junction [1,3] and road 2 at junction [2,3].

Suppose that at some point in time vehicle A passes source point X and receives a location data item by short-range transmission from the source point X. Suppose also that vehicle B, at an unrelated point in time, passes source point Y and receives a location data item from that source. Vehicle A now drives towards point Y and the distance quantity in location data item LD(X;A) is updated with the amount $MA(X,P_A)$ where $P_A$ represents the current position of the vehicle. Similarly, vehicle B decides to drive towards point X and as it progresses, updates its location data item LD(Y,B) by an amount $MA(Y,P_B)$.

Subsequently vehicles A and B pass near to each other (crossing point $P_{A,B}$) and they exchange location data items using their short-range transceivers (this exchange being controlled by processes 26B).

Concentrating on vehicle A, this vehicle now holds location data items LD(X;A) and LD(Y;B) and therefore has the following information regarding the location of the crossing point $P_{A,B}$:

the crossing point is at a maximum distance of $MA(X, P_{A,B})$ from known point X, this distance being the quantity held in field 27B of LD(X;A);

the crossing point is at a maximum distance of $MA(Y, P_{A,B})$ from known point Y, this distance being the quantity held in field 27B of LD(Y;B);

The maximum distance $MA(X,P_{A,B})$ will, of course, be greater than or equal to the minimum route distance MRD between X and $P_{A,B}$ leading to the inequality:

$MRD(X, P_{A,B}) <= MA(X,P_{A,B})$

Similarly:

$MRD(Y, P_{A,B}) <= MA(Y,P_{A,B})$

Vehicle A does not know which route—road 1 or road 2—it has taken from point X. However, for any particular route between points X and Y, if the route distance RD(X,Y) for that route is greater than the sum of the distance quantities $MA(X,P_{A,B})$ and $MA(Y,P_{A,B})$, then clearly the route concerned is not the one taken by the crossing vehicles A and B. This fact is used by the location determination process 26D to narrow down the location of the vehicle A. How successful this process is depends on the actual routes followed by the vehicles A and B (the actual routes may, of course, have includes elements such as: touring a car park, taking a wrong turn and back tracking, using roads not represented by map data known to A, etc.). A number of example cases are considered below.

(a) A and B Meet on a Minimum Route

If the meeting point $P_{A,B}$ is located on a minimum route between X and Y, then X to $P_{A,B}$ and Y to $P_{A,B}$ are both also therefore minimum routes. If vehicles A and B have followed those minimum routes without diversion, then $MRD(X,P_{A,B})=MA(X, P_{A,B})$
$MRD(Y,P_{A,B})=MA(Y, P_{A,B})$ are both true, so in fact $$MA(X, P_{A,B}) + MA(Y, P_{A,B}) = MRD(X,Y)$$

This last equation indicates that A and B have met on a minimum route between X and Y, and both have followed the minimum route.

Figure 4:
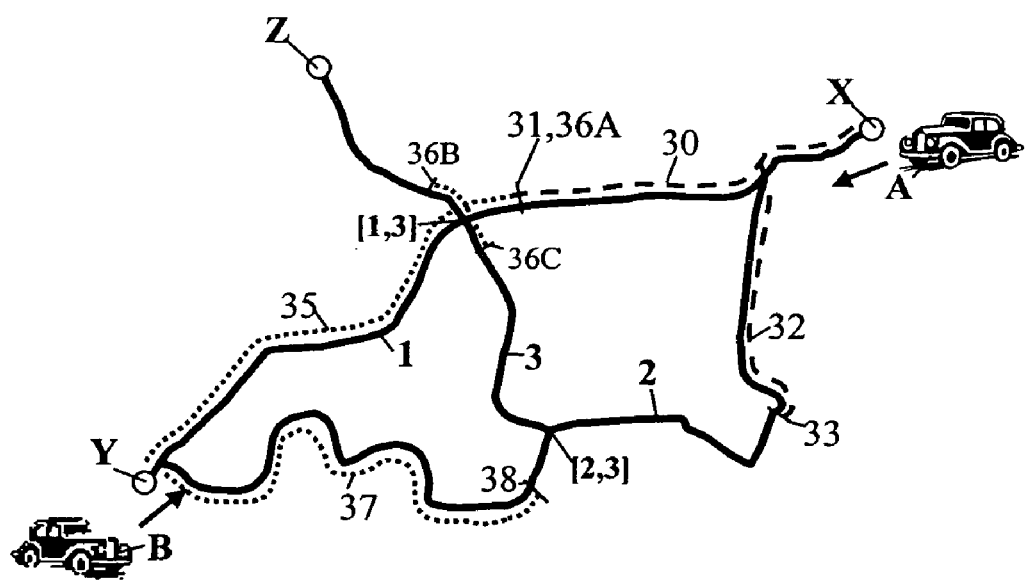
FIG. 4 is a diagram similar to FIG. 3 illustrating how location discovery is effected in a first example case.

This is depicted graphically in FIG. 4. Vehicle A on leaving point X could have followed map track 30 along road 1 up to a point 31 determined by the distance $MA(X, P_{AB})$; alternatively, A could have followed map track 32 along road 2 to point 33 also determined by the distance $MA(X, P_{A,B})$. Similarly, vehicle B on leaving point Y could have followed map track 35 along road 1 up to point 36A on road 1, or points 36B and C on road 3 (if B turned left or right at junction [1,3]), determined by the distance $MA(Y, P_{A,B})$; alternatively, B could have followed map track 37 along road 2 to point 38 also determined by the distance $MA(Y, P_{A,B})$. Since the map tracks 32 and 33 do not meet, the route followed to bring about the meeting of vehicles A and B is clearly not along road 2. In fact, points 31 and 36A coincide, this point of coincidence representing the only location satisfying the maximum source-distance bounds set by the distances $MA(X, P_{A,B})$ and $MA(Y, P_{A,B})$. This indicates that both vehicles have followed the minimum route along road 1 without deviation and have met at a point $P_{AB}$ corresponding to map point 31/36A.

The foregoing operation of applying the maximum distance bounds along map tracks to find locations simultaneously satisfying all applicable bounds is effected by process 26D.

If there are two or more minimum routes, then the distance information available to vehicle A (or B) is insufficient to enable a resolution of the ambiguity.

(b) Vehicles A and B Meet on a Minimum Route, but One or Both Have Diverged

In this case the distances $MA(X, P_{A,B})$ and $MA(Y, P_{A,B})$ reported in the location data items are greater than would be expected for a minimum route meeting so that:

$$MRD(X, P_{A,B}) <= MA(X, P_{A,B})$$
$$MRD(Y, P_{A,B}) <= MA(Y, P_{A,B})$$

Nevertheless, provided the divergence is small, there will remain just one route between X and Y that the vehicles A and B could have followed; however, there will now be some uncertainty as to the location of crossing point $P_{AB}$ since the maximum distance bounds will overlap along the minimum route by an amount corresponding to the divergences of the vehicles from that route ("divergences" here including any temporary reversals in direction of travel along the minimum route).

Figure 5:
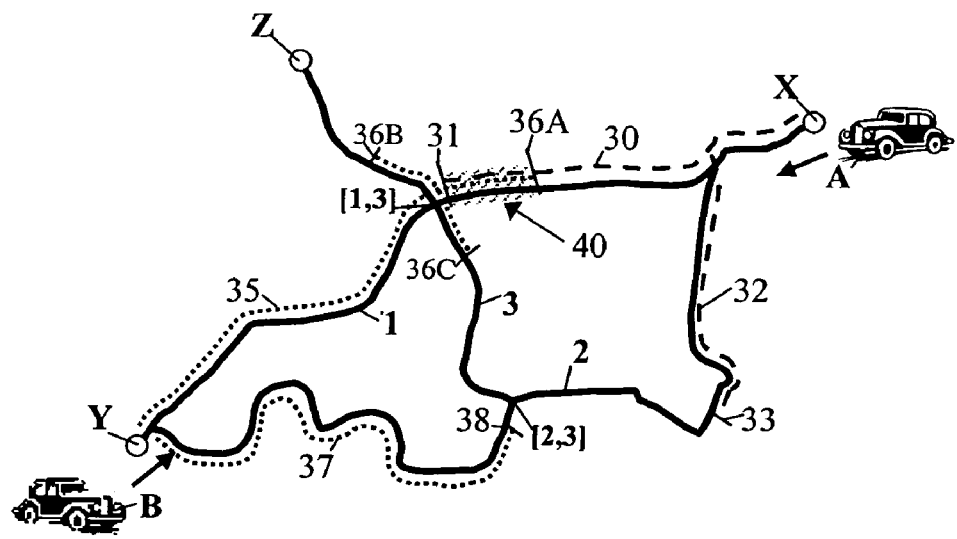
FIG. 5 is a diagram similar to FIG. 3 illustrating how location discovery is effected in a second example case.
Figure 6:
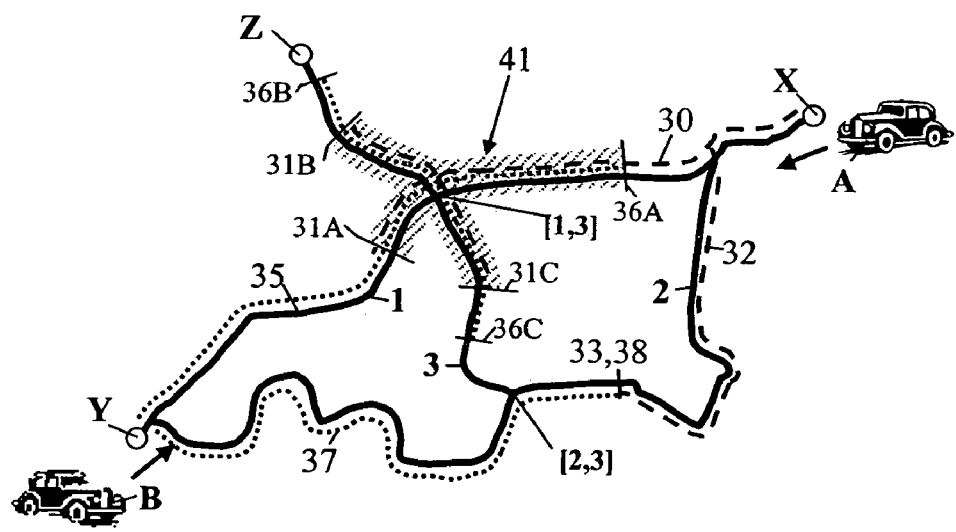
FIG. 6 is a diagram similar to FIG. 3 illustrating how location discovery is effected in a third example case.
Figure 7:
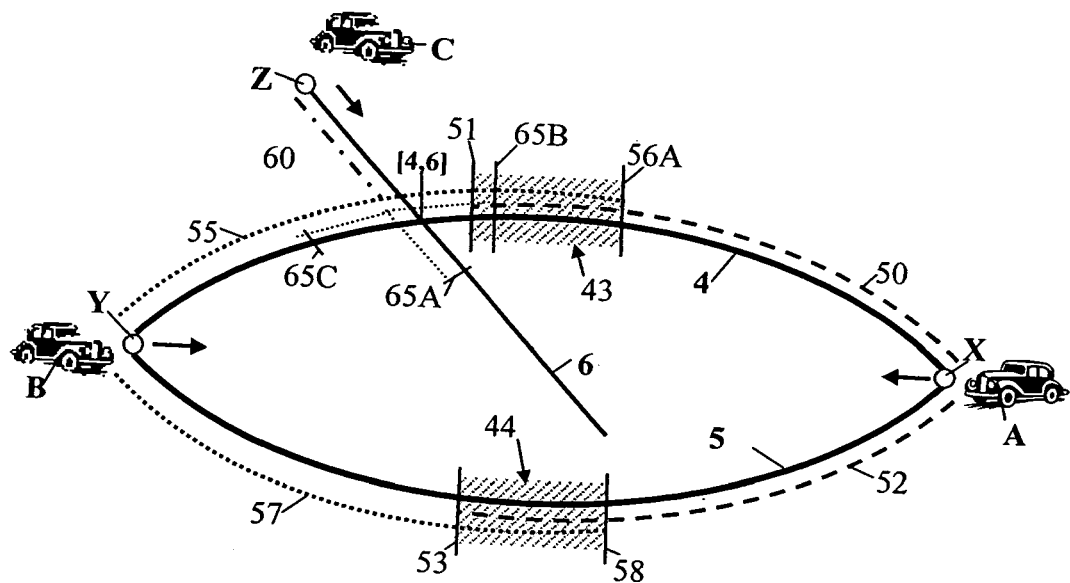
FIG. 7 is a diagram of a second map known to vehicle A, and illustrating how location discovery is effected in a fourth example case.

FIG. 5 illustrates the situation. Again the map tracks 32 and 37 along road 2 do not meet ruling out the possibility of the crossing point lying on these tracks. However, the end points for the tracks 30 and 35 along road are no longer coincidence but bound an overlap route segment 40 (shown hatched) for the tracks 30, 35. This overlap route segment 40 sets the limit on where crossing point $P_{AB}$ might reside, all points along the overlap route segment satisfying the maximum distance bounds set by the distances $MA(X, P_{A,B})$ and $MA(Y, P_{A,B})$ (c) Vehicles A And B Meet but Are Not on a Minimum Route In this case, vehicles A and B meet at some point $P_{AB}$ which is not on a minimum route; for convenience, however, it will be assumed that the vehicles have not deviated from the known routes (i.e. the routes between X and Y that are on the map available to A). The situation is depicted in FIG. 6 where the map tracks 32 and 37 for the vehicles moving along road 2 now meet, the distances $MA(X, P_{A,B})$ and $MA(Y, P_{A,B})$ bounding these tracks such that they end at the same point 33/38.

However, there obviously now exist many possible location solutions for crossing points along map tracks starting out along road 1. More particularly, track 30 now extends well past junction [1,3] along roads 1 and 3 to termination points 31A, B and C, whilst track 35 extends well beyond junction [1,3] in the opposite direction to terminate at points 36A, B and C. The overlap route segments 41 define the range of locations that satisfy the bounds set by the distances $MA(X, P_{A,B})$ and $MA(Y, P_{A,B})$. These distances thus provide inadequate information to uniquely place $P_{AB}$ on the map.

However, the process 26D can apply a probability rule to the effect that where there is little or no ambiguity of position along one route but a very large ambiguity along another route, then it is more likely that the true position is defined by the former rather than the latter.

Getting More Information From a Third Vehicle

Information from a third vehicle C may provide sufficient additional data to resolve or restrict ambiguities in position. In the following discussion, a different road network is assumed to that of FIGS. 3–6, this network being represented by a map (see FIG. 7), known to vehicle A, with two arcuate roads 4 and 5 extending between source points X and Y and a third road 6 extending from source point Z and crossing road 4 at junction [4,6]. Roads 4 and 5 present equal minimum distance routes between points X and Y.

As with the previous examples, vehicles X and Y have picked up location data items from source points X and Y respectively, have maintained these items as they progressed towards the points Y and X respectively, and have subsequently exchanged their location data items at their crossing point $P_{AB}$. The location data items in A's possession immediately after meeting B thus place upper distance bounds of $MA(X, P_{A,B})$ and $MA(Y, P_{A,B})$ on the position of vehicle A.

In the present example, it is assumed that one or both of the vehicles have deviated slightly from the minimum route between X and Y with the result that:

track 50 of vehicle A along road 4, terminating at point 51, overlaps by overlap segment 43 with track 55 of vehicle B along road 4, terminating at point 56A;

track 52 of vehicle A along road 5, terminating at point 53, overlaps by overlap segment 44 with track 57 of vehicle B along road 5, terminating at point 58.

Vehicle could thus be positioned anywhere in overlap segments 43 or 44.

Consider now a vehicle C which, having passed close by source point Z where it picked up a location data item LD(Z;C), travels along road 6 and at some point $P_{CB}$ crosses with vehicle B (the location of the crossing point $P_{CB}$ is not relevant to the present discussion). Vehicle B receives C's location data item which now becomes location data item LD(Z;C,B). Vehicle updates this item as it continues its journey to the point $P_{AB}$ where it crosses with vehicle A. At this crossing, vehicle A receives from vehicle B not only location data item LD(Y;B) but also location data item LD(Z;C,B). The distance field 27B of this latter location data item contains distance quantity:

$$MA(Z, P_{CB}) + MA(P_{CB}, P_{AB})$$

The first term is the amount by which update process 26C of vehicle C updated the distance field up until its transfer of the location data item to B; the second term is the amount by which update process 26C of vehicle B has increased the distance field between receiving the location data item from C and passing it on to A. Note that the distance quantity in field 27C can be expressed as a single figure or as separate amounts for each transporting entity).

The quantity $MA(Z,P_{CB})+MA(P_{CB},P_{AB})$ is clearly greater than or equal to the minimum road distance from point Z to the crossing point of A and B, that is:

$MRD(Z,P_{AB})<=MA(Z,P_{CB})+MA(P_{CB},P_{AB})$

Vehicle A therefore now has a third distance bound, this time from point Z, that it can use to determine its location. This distance bound is used to terminate map track 60 from Z to end points 65A, B and C on roads 4 and 6. The branch of map track 60 that lies on the road 4 towards point X overlaps with the overlap segment 43 determined by the distance bounds from X and Y, and further limits the possible locations of vehicle A at its meeting with vehicle B to overlap segment 44. Thus, not only has the ambiguity of A's position as between minimum routes 4 and 5 been resolved in favor of road 4, but the accuracy of location along the road 4 has been increased.

The diffusion of location data items from C to B to A has thus helped in the determination of the location of vehicle A. This diffusion of location data items can be viewed as the diffusion of inequality equations relating minimum road distance MRD to the distance quantities provided by the distance units of the vehicles involved.

It will be appreciated that as vehicle A proceeds from its meeting with B, it will continue to update its location data items LD(X;A), LD(Y;B,A) and LD(Z;C,B,A) by increasing the distance quantity in the field 27B of each item by the distance traveled by A. These location data items can then be passed on to the next vehicle that vehicle A meets.

Whilst in the above example, C crossed with B before B met A, C's location data item would have equally helped A derive its location in the alternative situations of:

C passing close to A prior to A meeting B,

C passing close to A, after A meeting B.

Discarding Location Data

Figure 8:
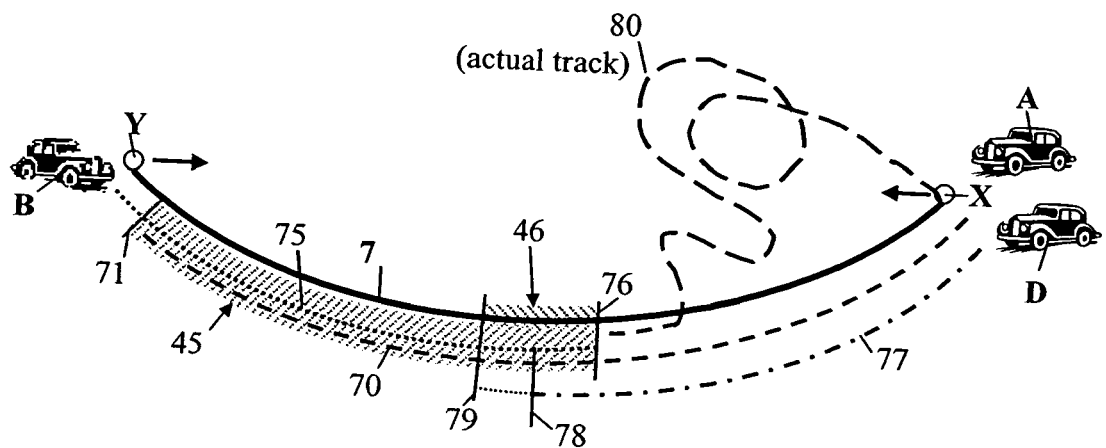
FIG. 8 is a diagram of a map known to another vehicle-based mobile entity B, and illustrating how location discovery is effected in a fifth example case.

Consider the road network depicted by the map, known to vehicle B, shown in FIG. 8—this network is simply a single road 7 connecting points X and Y. In reality there may be other routes not shown on the map such as a route following track 80 (track 80 is not part of the map and is unknown to the data-handling subsystem of vehicle B).

Vehicle A passes close by to point X where it receives a location data item, and then follows un-mapped track 80 before joining road 7 where it meets vehicle B that has previously passed point Y. Vehicles A and B exchange location data items. Suppose vehicle B now tries to establish its location. The location data item LD(Y;B) puts B somewhere on map track 75 from Y up to point 76 set by the distance $MA(Y,P_{AB})$ whilst location data item LD(X;A,B) puts B somewhere on map track 70 from X to point 71; there is thus a very large overlap segment 45 occasioned by the fact that A actually followed un-mapped track 80.

Assume now that vehicle D also passes point X and travels towards point Y, this time with no deviations from road 7. Vehicle D crosses with vehicle B a short time before B crosses with vehicle A. Vehicle B receives the location data item LD(X;D) from vehicle D and this item includes the distance quantity $MA(X,P_{BD})$ in field 26B. As B takes over the location data item it becomes item LD(X;D,B) and this item is maintained by B such that at the time B crossed with A, the distance quantity in field 26B of the item is:

$MA(X,P_{BD})+MA(P_{BD},P_{BA})$ which represents a total mileage accumulation from point X. Provided the second term of this expression is not too large, this total mileage from X contained in LD(X;D,B) will be less than the total mileage from X given by the value $MA(X,P_{AB})$ contained in the LD(X;A) transferred to B by A. In other words, the upper bound on the distance from X contained LD(X;D,B) is a tighter bound than that contained in LD(X;A) and the latter location data item can be discarded.

In terms of the graphical representation of FIG. 8, the bound on distance from X set by LD(X;D,B) is the track 77 (shown chain-dashed) of D along road 7 to point 78 where it crossed with B plus the further track (shown as a small dotted line) along road 7 to point 79. The uncertainty on the position of vehicle B at its point of crossing of vehicle A is thus represented by the overlap segment 46 between point 79 and the point 76 corresponding to the maximum distance of B from Y.

The discarding of the location data item $LD(X,P_{AB})$ can be viewed as the discarding of a looser inequality on the minimum route distance from X to $P_{AB}$ in favor of a tighter inequality, that is, the inequality:

$MRD(X,P_{AB})<=MA(X, P_{AB})$ is discarded in favor of the tighter inequality:

$MRD(X,P_{AB})<=MA(X,P_{DB})+MA(P_{DB},P_{AB})$

This discarding of location data items avoids the need for the mobile entities to be able to hold a large number of location data items. Clearly, as time passes the inequalities represented by the stored location data items will become looser (and less useful).

However, further vehicles will be met later on, potentially giving tighter inequalities and therefore more useful information.

Determining Direction of Travel

By determining successive locations of a vehicle as new location data items are received, it is generally possible to determine the direction of travel of the vehicle.

Thus, with reference to FIG. 9, consider the case of vehicle B traveling past point Y towards X, the vehicle having a map showing (for simplicity of explanation) a single road 8 between points Y and X. The map track of the vehicle is shown by dotted line 91. Vehicle B successively passes vehicles A and E that are traveling from point X and exchanges location data items with these vehicles. When B passes A, it determines its location as being within an overlap segment 92, being the overlap of the then current extent of track 91 and track 90; the passing of vehicles A and B with the accompanying exchange of location data items and location determination by B, can conveniently be considered as a "location event" for vehicle B. A similar location event takes place when B and E cross, the location of this crossing point being determined as within overlap segment 94. The locations of B determined at the two successive location events shows that vehicle B is traveling along road 8 towards X.

If this directional information is combined with a reasonably accurate location estimate, then for the next period of time (until a junction is encountered), the location of the vehicle will in general be known accurately by adding the milometer increase MA onto the distance traveled along the road, as represented by the map (this, of course, assumes that the vehicle does not turn around).

The location and direction of travel information permits the data handling subsystem to predict where the vehicle will be in a few minutes and to alert the user as to upcoming features and facilities. For example, in FIG. 9 the vehicle B after the second location event can anticipate that shop 95 will be reached shortly and can therefore alert the vehicle driver accordingly. The location-dependent information about features and facilities required for this service are, for example, stored with the map data or passed to the vehicle in the short-range messages used to pass the location data items.

Pedestrian Location (FIGS. 10, 11)

The same general principles discussed above in relation to using diffused location data items to determine vehicle location also apply to pedestrian-based implementations of the FIG. 2 mobile entity, the main differences being:
- for pedestrians, distance traveled is determined, not by an odometer, but by the product of a speed value and elapsed time;
- the constraints placed on the route followed by the mobile entity are generally far less, if present at all, for pedestrians as compared to vehicles which are considered as constrained to follow the roads represented in the map data.

This second difference means that the distance quantity contained in field 26B of a location data items will generally simply determine the radius of a circle, centered on the corresponding known location, that corresponds to the maximum distance of travel of the location data item from the known point. The location of the user is then restricted to the overlap of the maximum-travel circles centered on the known location points for which the entity concerned holds location data items. In fact, map-based constraints can be applied in much the same way as for the vehicle embodiments in cases where it is known that pedestrians are constrained to certain routes or areas. The most likely constraints are forbidden areas (e.g. restricted-access buildings) and rights-of-way across private land.

FIG. 10 illustrates an example involving three location-data item source points X, Y and Z, and three pedestrians F, G and H equipped with mobile devices having the FIG. 2 functionality. Source points X and Z are situated on the boundary of a forbidden area 100 known at least to the device carried by pedestrian G whose progress will be considered below. Source Y is, for example, mounted on a street light. Assume that pedestrians F and G pass points Z and X respectively and in due course cross close by each other. Location data item LD(Z;F) is passed from F to G and is used by G along with its location data item LD(X;G) to determine its position, taking account of the constraints presented by its map data (that is, the area 100).

The maximum distance of the crossing point $P_{GF}$ from Z is set by the value $MA(Z,P_{GF})$ contained in LD(X;G) passed from G to F (for convenience, the "MA" ("Milometer Advance") label is retained here, notwithstanding that the distance traveled is estimated on the basis of elapsed time and speed value). The bound of the locations that could have been reached from Z is delimited by semi-circular arc 102 centered on Z with radius $MA(Z,P_{GF})$, and quarter-circle arc 103 centered on corner 104 of area 100 with radius equal to the difference between $MA(Z,P_{GF})$ and the distance from Z to corner 104. Similarly, the maximum distance of the crossing point $P_{GF}$ from X is set by the value $MA(X,P_{GF})$, the bound of the locations that could have been reached being delimited by semicircular arc 105 centered on X with radius $MA(X,P_{GF})$, and quarter-circle arc 106 centered on corner 107 with a radius equal to the difference between $MA(X,P_{GF})$ and the distance from X to corner 107.

The two bounded areas overlap in overlap zone 140 which therefore defines the possible location of crossing point $P_{GF}$.

Pedestrian G continues and in due course meets pedestrian H who has previously passed close to source point Y. Location data item LD(Y;H) is passed from H to G. G now recalculates his position based on the circle 110 defining the maximum distance of the meeting point $P_{GH}$ from Y—that is, $MA(Y,P_{GH})$—and arcs 111 and 112 that delimit the further progress of G from his meeting with F. More particularly, arc 111 corresponds to arc 106 bounding the distance of G from X but has a larger radius to reflect the further distance $MA(P_{GF},P_{GH})$ traveled by G since meeting F; similarly, arc 112 corresponds to arc 102 bounding the distance of G from Y but with a larger radius to reflect the further distance $MA(P_{GF},P_{GH})$ traveled by G. Circle 110 and arcs 111, 112 delimit an overlap area 141 within which meeting point $P_{GH}$ must lie.

With regard to the speed value used to determine distance traveled, it is possible to make the assumption that there will be a generally observed upper bound of walking speed which the vast majority of pedestrians observe when walking through a public place. This upper bound speed can be preset into all the mobile devices for the purposes of effecting distance calculations (distance unit 25 in FIG. 2). Provided pedestrians walk at or near this upper bound speed, and further provided that they walk in reasonably straight lines, accurate location estimates can be derived. Whilst there will inevitably be some people who will be walking well below the upper bound speed, a location data item received from such a pedestrian is likely to be rapidly discarded in favor of tighter bound data received from another pedestrian.

In a small minority of cases, people will exceed the assumed upper bound speed. Preferably, the data-handling subsystem 22 is operative to detect when this happens on the basis of detecting when this upper bound speed is unable to account for the pedestrian concerned moving between two source points within an indicated time interval. For example, if person G passes point X and then time T later G passes point Y, and G has been running between the two, then by dividing the distance as calculated from the electronic map between X and Y, by the time T, it can be detected that G is proceeding at a speed above the upper bound.

If G's mobile device detects that it is traveling above the upper bound speed, it is arranged to stop diffusing location data items for a period of time. This is done to prevent errors in the location calculations of other devices consequential on G exceeding the upper bound. Of course, G can still diffuse location relevant information. In the event of location data items being embedded in a location relevant information message, ceasing to diffuse location information maybe simply achieved by setting a bit in the message to indicate in effect 'the location information is suspect'. However, G exceeding the upper bound does not imply that G cannot fix its location. G can still receive diffused location information from other devices and so calculate location. G simply should not participate in further diffusing location information.

There are other circumstances in which data-handling subsystem 22 can determine that a device is being carried at a speed above the assumed upper bound. For example, if G passes point X, and F passes point Z, and G and F meet after respective times $T_G$ and $T_F$ after passing the respective points X, Z, and the distance between X and Z divided by $(T_G+T_F)$ gives a speed greater than the upper bound speed, then clearly at least one of G and F has been proceeding at a speed greater than the upper bound speed. In these circumstances, both G and F should cease to diffuse location information.

Rather than all devices having the same fixed upper bound speed, the upper bound speed could be determined by subsystem 22 for each device from observations similar to those discussed above for detecting excess speeds. If a pedestrian, for whatever reason, never traveled above a certain speed, then this individual upper bound, rather than a general upper bound, could be used to further improve the accuracy of the location estimates.

Generally with regard to location determination for pedestrians as opposed to vehicles, it may be noted that whilst a finer resolution will usually be required, the frequency of source points will generally be higher at least in shopping malls and similar locations.

In a very similar way to the vehicle case, if a succession of location fixes of a reasonable accuracy are obtained, then the general direction in which the person is going can be determined. Again, this might be used for alerting the pedestrian of upcoming features and facilities. It is also possible to provide location estimates based on last location event (such as exchange of location data items with another device) and estimate of direction and speed.

In the foregoing discussion, both for vehicles and pedestrians, the actual range of the short-range wireless transceivers of the mobile entities has not been taken into account. This is generally acceptable for the vehicle case since the transceiver range will be small compared with the distances traveled by the vehicle. However, in the case of pedestrians, the transceiver range is a greater fraction of the typical distance being moved by a pedestrian; furthermore in a crowded area, such as a shopping mall, a message can diffuse quickly from device to device making the cumulative range of the utilized devices by far the greatest likely contributor to message displacement from the location data source. This factor can be taken into account by increasing, in transmitted messages, the value of the distance quantity 27B (measured and/or estimated maximum distance from the location data item source) by a transceiver range value. Since, of course, the range of the transceiver is a function not only of the transmitter but also of the sensitivity of the receiving device, this range value added to the distance quantity 27B should be for standard receiving conditions. If this range value is added at each hop from device to device, the distance quantity 27B will be increased by the sum of the ranges of the participating devices. In fact, where all devices have approximately the same range, a simple implementation for taking account of the transmission hops would be to include in each location data item, effectively as a component of the distance quantity, a hop count which a device could then multiple by a range value to derive the actual distance quantity component arising from transmission hops.

The foregoing consideration of adding transmission hop values to the distance quantity 27B, effectively assumes that all devices will be receiving at the maximum range, which is unlikely to be the case. By separately specifying the range of the transmitting device in the transmitted message (and not including it in the transmitted the distance quantity 27B), the receiving device can choose whether to add the full range value to the received distance quantity 27B or whether only a percentage amount should be added because the receiving device believes itself not to be at the maximum range from the transmitting device. Such a belief can be derived from the received signal strength, a strong signal indicating that the transmitting device is closer than if a weak signal is received. Of course, the transmitting device can automatically add 100% of its range to the distance quantity 27B when transmitting, the receiving device then being responsible for subtracting an appropriate percentage of the transmitting devices range (this range value still being included in the transmitted message).

Increasing the distance quantity 27B of a location data item according to displacement of the item, whether as a result of being stored in a moving entity or as a result of a transmission hop, can be effected for any type of entity (mobile or static, vehicle or person) and regardless of the usage to which the location data item is subsequently put by a receiving entity.

Static Entities

Static entities are entities that do not normally move. Such entities can be treated as if they were pedestrian entities but with a maximum walking speed of zero. Thus a static entity would transmit received location data items with the same value of the distance quantity 27B as received (or only increased by a range value as described above). A typical static entity is a PC or peripheral in an office. Assuming there are fixed location beacons in the environment (but not necessarily in immediate range of a static entity), then over a period of time the static entity will accumulate a substantial amount of location data from passing mobile entities and derive a fairly accurate idea of its location which it can pass on.

Of course, a static entity may also be movable. When a static device is moved into a new location, it must discard its previously-determined location and either update all its location data items by an estimate of the distance it has been moved or discard those items entirely and start afresh. In this respect, it is noted that the static item is very likely only to be moved when powered down so that it cannot, with any reliability, form a time-based estimate of how far it has been moved; as a result, it is likely that all location data will need to be discarded. In any event, it is important to be able to determine when a static entity has been, or might have been moved. This can be done in several ways, for example:

- by directly detecting movement of an entity (such as by using tilt sensors or other displacement sensors—unless the entity is arranged to have these sensors, which are typically electrical/electronic in nature, always powered up, it will be necessary to use sensors with some form of mechanical or magnetic memory);
- by detecting gross discrepancies between the most recently received location data and previously received data (it then being assumed that the most recently received data has been received following displacement of the entity);
- by detecting power-down/power-up of the entity;
- by detecting major changes in the set of other entities which the entity concerned can contact via its short range-transceiver (whilst this set of entities may be expected to change continually as mobile entities pass into and out of range, there will generally be other static devices within range that have a more permanent presence so that the disappearance of two or more such devices substantially at the same time is likely to indicate that the subject entity has been moved); the subject entity can be arranged to periodically check the set of entities within range of its short-range transceiver in order to determine whether it has been moved.

Being able to detect when an entity is not currently static (that is, it is moving) is also useful for semi-static entities (and pedestrians can be considered as falling into this category). Thus, when a semi-static entity is detected as moving, the value of MA is increased by an appropriate (speed)×x(time) value whereas when no movement is detected, the value of MA is not increased.

Best Estimate Location

In the foregoing description of deriving mobile entity (vehicle/pedestrian) location, the location was determined as an overlap segment or zone in which the mobile entity must lie. This section concerns how to derive a best estimate of location within that zone or segment (generally, 'area').

For simplicity of explanation, consideration will first be given to a pedestrian scenario where there are no constraints on route. In this case, for each location data item picked up by a mobile entity, there is a circle of possible entity positions, this circle being centered on the location of the source of the location data item (this source being referred to below as a 'FAP' or 'Fixed Access Point') and expanding with actual or assumed entity travel plus any transmission hops; the mobile entity lies somewhere within this circle. Such a circle is called a 'FAP circle' in the following.

A general approach for determining best estimate of location is as follows. In general there will be an area 134 (see FIG. 11) formed by the overlap of the areas of multiple FAP circles 130 to 132, i.e. the area of overlap will be in all FAP circles. This is found by finding the points of intersection between each pair of FAP circles. The (in general 2) points of intersection between 2 circles can be found using a well known and simple formula which derive the coordinates of the points of intersection.

The points which make up the vertices of the boundary of the area of overlap 134 will be those points 135 of intersection which are inside all of the other circles, again easily determined computationally.

A simple best estimate of position can be made by taking the mean (average) of the vertices 135 of the area of overlap 134.

Figure 12:
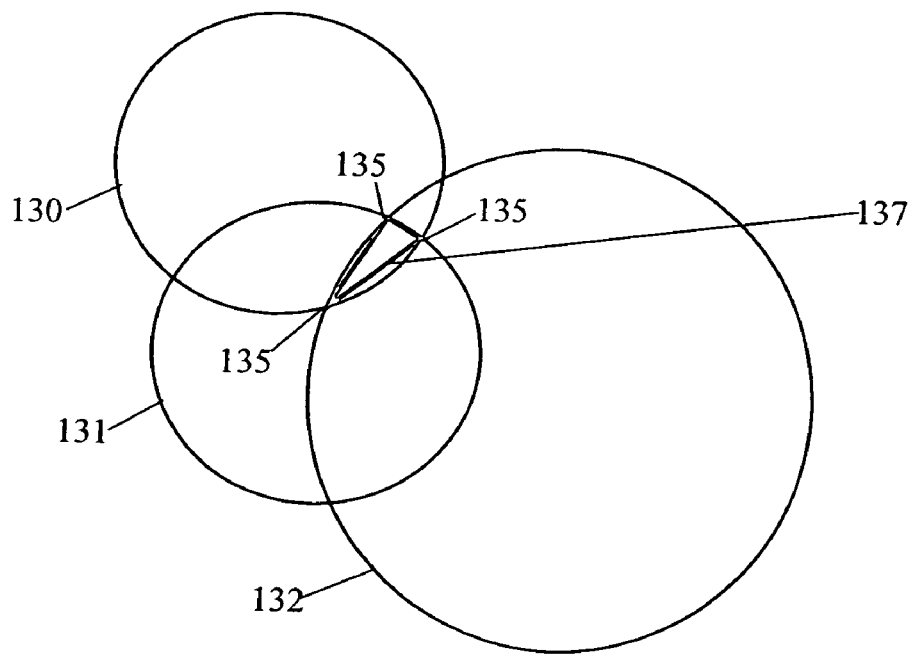
FIG. 12 is a diagram illustrating a second of determining a best estimate of location from an area of possible locations.

Another way of making the best estimate is to approximate the area of overlap 134 as having straight lines, (so the area of overlap is approximated as a polygon, in this particular case a triangle 137 as illustrated in FIG. 12) and to work out the center of gravity of the polygon. The center of gravity is in some sense the center of the area of overlap. This is easily calculated in the case of the triangle shown, and for more complex polygons, there are various ways of calculating the center of gravity, one of which is to break down the polygon into a set of rectangles and triangles which form it, calculate the center of gravities (and areas) of the constituent rectangles and triangles, and from them calculate the center of gravity of the whole polygon (again the area of the whole is likely to be calculated to do this).

It will be appreciated that other methods can also be used for determining a best estimate location. For example, where two FAP circles overlap, then (by calculation) they can both be progressively reduced in size by the same percentage amount of their original respective radii until the circles only touch, this touching point then being taken as the best estimate location. A similar technique can be applied where there are three or more overlapping FAP circles, the first circle-touching point produced being the location best estimate.

Conversely, where two (or more) FAP circles fail to intersect, then the radii of the circles can be increased (rather than decreased) by the same percentage amount until a touching point is reached, the touching point again being the location best estimate. Such a situation can arise because the distance quantity 27B in a location data item may well only be an estimate of the maximum distance of an entity from the specified FAP and could therefore be under-valued.

In a situation where a particular FAP circle is actually inside all of the others (i.e. the information pertaining to one FAP is more recent or 'tighter' that the others) then the best estimate is in fact that the mobile device in question is close to the center of that FAP.

The above analysis leads to strategies for minimizing the amount of data transmitted. One strategy would be to eliminate from transmission to other devices a FAP circle (that is, a location data item with the center of a FAP circle and radius, these being the elements 27A and B of the FIG. 2 location data item 27) from those to be sent on, if it does not contribute to a circle-circle intersection creating a vertex of the area of overlap 134; a less stringent strategy is to take the set of FAP circles which contribute to the vertices of the area of overlap, and if any of the FAP circles encloses all of the circles in the above set, then to eliminate the enclosing FAP circle from being sent on in any future exchange of information with other mobile entities.

With regard to route constraints, these can be used to further limit where the mobile entity lies within the overlap zone. In fact, the type of route constraint is likely to influence what method is used to derive a best estimate of position within the overlap zone. Thus for a road vehicle where roads provide route constraints, a simply midway position along a road between the beginning and end of the overlap zone is likely to be a good solution with account being taken of the likely decisions at route junctions based on road importance, intended or likely destination, etc.

Simplified Location Determination

In general terms, an entity will have received one or more location data items LD1 to LDn each comprising the coordinates (typically x, y coordinates) of a specific known location, and a distance quantity d that is a measure or estimate of the maximum distance to the known location based on the distance traveled by carrying entities and/or the transmission hop distance each time the location data item is passed on. In other words, the entity possesses location information that can be represented as:

(d1, x1, y1); (d2, x2, y2); (d3, x3, y3); etc.

Particularly for hand-held mobile entities, the processing load required to determine the entity's current location should be kept to a minimum. It may therefore be convenient in certain circumstances not to perform the full calculations required to effect location determination from available location data items in any of the previously-described ways. Instead, a less accurate but simpler algorithm can be employed that operates on the basis that the further away a location data item is from where it was sourced, the less important it is in the location determination process. The simplest way of accomplishing this is to make the importance of the known location identified by a location data item proportional to the inverse of the distance quantity ($1/d$) of that item. A weighted average can be calculated as follows:

X coordinate of estimate of position=$K.(x1/d1+x2/d2+x3/d3 \ldots)$ where K is defined as $1/(1/d1+1/d2+1/d3 \ldots)$ Y coordinate of estimate of position=$K.(y1/d1+y2/d2+y3/d3 \ldots)$ where K is again $1/(1/d1+1/d2+1/d3 \ldots)$ An alternative form of expressing this is:

X coordinate of estimate of position=$K.(x1.c1+x2.c2+x3.c3 \ldots)$

Y coordinate of estimate of position=$K.(y1.c1+y2.c2+y3.c3 \ldots)$ where $c_i$ is equal to $1/d_i$ and K is $1/(c1+c2+c3 \ldots)$ In the case where c1, c2, c3 etc. are all the same, the above expression just leads to a straightforward average of x1, x2, x3 ... and y1, y2, y3 ...

Note that in order to avoid di being zero, at least the first transmission hop should be taken account of in di (this can be guaranteed by having the short-range transmitter at each known location always include a value for d equal to the range of the transmitter).

In general, there exists a class of location estimates, where the estimate is of the form:

X coordinate of location estimate=F(d1, d2, d3 . . . , x1, x2, x3, . . . )
Y coordinate of location estimate=G(d1, d2, d3 . . . , y1, y2, y3, . . . ) or even more generally:
X coordinate of location estimate=H(d1, d2, d3 . . . , x1, x2, x3, . . . y1, y2, y3, . . . )
Y coordinate of location estimate=L(d1, d2, d3, x1, x2, x3, . . . y1, y2, y3, . . . )

Location Discovery in Mixed Mode Situations

As already indicated, the type of map-based route constraint applied when determining location depends on the general type of mobile entity being considered (in the foregoing, whether vehicles or pedestrians are being considered). It is possible, in fact, to allow for location data items to be exchanged between different types of mobile entity. For example, railway locomotives could be configured as mobile entities similar to vehicles and used to provide location data items to vehicles traveling near the locomotive; in this case, when considering the distance quantity in field 27B of a location data item just received from a locomotive, the receiving vehicle should constrain the corresponding map track to be along railway lines on the vehicle's map. It the purpose of field 27C of a location data item to indicate what type of constraint is applicable to the distance quantity in field 27B, the field being inspected by process 26D before the latter utilizes the distance quantity in location determination. Of course, where the distance quantity in field 27B is made up of terms associated different types of route constraint, then these terms should be separately stored in field 27B and corresponding route constraint indicators stored in field 27C.

Variants

Many variations are, of course, possible to the above-described embodiments of the invention. For example, the source points for location data items need not be fixed but could be mobile devices that derive their own location by some other means (such as by using a GPS system or a cellular radio network location technique).

With regard to the maps held by the mobile entities, the map data may be stored semi-permanently in the entities. Alternatively, the map data can be automatically downloaded for example, when a pedestrian carrying a mobile device enters a shopping mall. A third possibility is that the map data is sent to mobile entities using diffusion.

It will be appreciated that any suitable coordinate system can be employed for specifying locations; for example a latitude/longitude based coordinate system can be used or a locally defined coordinate system (the latter potentially being more appropriate for use in an environment such as a shopping mall or theme park).

As already indicated in describing the situation depicted in FIG. 6, where a vehicle could be located in two (or more) zones, it may be appropriate to assess which is the most probable zone having regard to surrounding circumstances. More particularly, the location determination operation can be arranged to determine which location zone is the most probable on the basis of one or more of the following probability indicators:

the size of the location zones as compared with an expected degree of location uncertainty (a large zone being discarded where only limited inaccuracy is expected);
the natures of the routes followed in order to arrive at the location zones from the known locations involved (in other words, major routes are more likely to have been followed as opposed to minor roads); also, timing indications can be used to indicate the likely nature of the road used with fast transit times favoring the use of major roads;
the previous history of locations visited or passed through by the mobile entity;
the correspondence of sensed travel events, such as turning, with opportunities for such events along routes to the location zones (this requires, of course, the provision of suitable sensors feeding data to the data-handling subsystem).

The invention claimed is:

1. A method of disseminating location information wherein location data items originating at known locations are passed to, and diffused between, entities by short-range communication, each location data item specifying the said known location at which it originated and including a distance quantity indicative of an upper bound value for the distance to the specified known location, each entity increasing the distance quantity of each location data item it handles to take account of additional travel of the location data item as perceived by the entity.

2. A method according to claim 1, wherein a said entity, which is a mobile entity, increases the distance quantity of the or each location data item it handles by an amount corresponding to the distance moved by the entity whilst holding the location data item.

3. A method according to claim 2, wherein the mobile entity is a vehicle equipped with a short-range transceiver and an odometer, the vehicle increasing the distance quantity of its location data items by the distance travelled by the vehicle as indicated by said odometer.

4. A method according to claim 2, wherein the mobile entity is a pedestrian carrying a mobile device with a short-range transceiver, the device effecting an estimate of the maximum distance likely to have been travelled by the pedestrian based on a speed value and elapsed time, and the device increasing the distance quantity of its location data items by said estimate of the maximum distance likely to have been travelled by the pedestrian.

5. A method according to claim 4, wherein said speed is the maximum speed of the pedestrian as judged over time by the device based on the time taken for the pedestrian to move between locations as determined by the location determination operation.

6. A method according to claim 4, wherein said speed is a standard maximum speed for walking pedestrians, the device:
monitoring the current speed of the pedestrian based on the time taken for the pedestrian to move between locations of known position, and
in the event of the current speed of the pedestrian exceeding said standard maximum speed, preventing the passing on of location data items from the mobile entity to other said entities.

7. A method according to claim 1, wherein the distance quantity of a said location data item is increased, for each transmission hop between two entities, by an amount related to the transmission range of the transmitting entity.

8. A method according to claim 7, wherein the increase of said distance quantity is a fixed range value for the transmitting entity, this range value being added by the transmitting entity to said distance quantity.

9. A method according to claim 7, wherein the said distance quantity incorporates a hop count for providing a measure of the distance travelled by the location data item concerned as a result of transmission hops.

10. A method according to claim 7, wherein the increase of said distance quantity is a fraction of a range value for the transmitting entity, this fraction being determined by the receiving entity in dependence on the received signal strength, the receiving entity adjusting said distance quantity accordingly.

11. A method according to claim 1, wherein a said entity, which is a mobile entity, increases the distance quantity of the or each location data item it handles both by an amount corresponding to the distance moved by the entity whilst holding the location data item and by an amount related to the transmission range of the transmitting entity in respect of one of receipt and transmission of the location data item by mobile entity.

12. A method according to claim 1, wherein a said entity determines its location by determining a location simultaneously consistent, or most nearly consistent, with the upper bound values it knows of as a result of location data items it has received.

13. A method according to claim 12, wherein said entity in determining its location, applies one or more route constraints for how the location data items passed to the mobile entity.

14. A method according to claim 13, wherein said entity in determining its location, applies a constraint that the said upper bound values are distances along predetermined routes from the known locations concerned.

15. A method according to claim 14, wherein said predetermined routes are routes on a map represented by map data known to the entity.

16. A method according to claim 13, wherein said entity in determining its location applies a constraint that the said upper bound values are distances along indeterminate routes that avoid particular zones.

17. A method according to claim 13, wherein a received location data item includes an indication of a constraint type to be applied over at least a certain length of the associated upper bound distance value.

18. A method according to claim 12, wherein upon said entity receiving a location data item indicating an upper bound distance value to a known location for which a location data item has been previously received, one of the location data items is discarded, the discarded item being the one indicating the larger upper bound distance value to the known location taking account of any increases due to movement of the entity after item receipt.

19. A method according to claim 12, wherein upon location determination by said entity initially indicating multiple location zones where the entity could be located, the entity seeks to determine which location zone is the most probable on the basis of one or more of the following probability indicators:
　the size of the location zones as compared with an expected degree of location uncertainty;
　the natures of the routes followed in order to arrive at the location zones from the known locations involved;
　a previous history of locations visited or passed through by the entity;
　the correspondence of sensed travel events, such as turning, with opportunities for such events along routes to the location zones.

20. A method according to claim 12, wherein the location of said entity is determined on two separate occasions with the later determination using location data received after the first determination whereby to enable an indication of the average direction of travel to be derived.

21. A method according to claim 12, wherein a best estimate of location is derived within an area of possible locations based on an averaging relative to vertices of that area.

22. A method according to claim 21, wherein said estimate is carried out by averaging of coordinate values of said vertices.

23. A method according to claim 21, wherein said estimate is carried out by finding the center of gravity of a polygon delimited by said vertices.

24. A method according to claim 2, wherein a said entity determines its location by determining a location simultaneously consistent, or most nearly consistent, with the upper bound values it knows of as a result of location data items it has received.

25. A method according to claim 24, wherein said entity in determining its location, applies one or more route constraints for how the location data items passed to the mobile entity.

26. A method according to claim 25, wherein said entity in determining its location, applies a constraint that the said upper bound values are distances along predetermined routes from the known locations concerned.

27. A method according to claim 26, wherein said predetermined routes are routes on a map represented by map data known to the entity.

28. A method according to claim 25, wherein said entity in determining its location applies a constraint that the said upper bound values are distances along indeterminate routes that avoid particular zones.

29. A method according to claim 25, wherein a received location data item includes an indication of a constraint type to be applied over at least a certain length of the associated upper bound distance value.

30. A method according to claim 24, wherein upon said entity receiving a location data item indicating an upper bound distance value to a known location for which a location data item has been previously received, one of the location data items is discarded, the discarded item being the one indicating the larger upper bound distance value to the known location taking account of any increases due to movement of the entity after item receipt.

31. A method according to claim 24, wherein upon location determination by said entity initially indicating multiple location zones where the entity could be located, the entity seeks to determine which location zone is the most probable on the basis of one or more of the following probability indicators:
　the size of the location zones as compared with an expected degree of location uncertainty;
　the natures of the routes followed in order to arrive at the location zones from the known locations involved;
　a previous history of locations visited or passed through by the entity;
　the correspondence of sensed travel events, such as turning, with opportunities for such events along routes to the location zones.

32. A method according to claim 24, wherein the location of said entity is determined on two separate occasions with the later determination using location data received after the first determination whereby to enable an indication of the average direction of travel to be derived.

33. A method according to claim 24, wherein a best estimate of location is derived within an area of possible locations based on an averaging relative to vertices of that area.

34. A method according to claim 33, wherein said estimate is carried out by averaging of coordinate values of said vertices.

35. A method according to claim 33, wherein said estimate is carried out by finding the center of gravity of a polygon delimited by said vertices.

36. A method according to claim 7, wherein a said entity determines its location by determining a location simultaneously consistent, or most nearly consistent, with the upper bound values it knows of as a result of location data items it has received.

37. A method according to claim 36, wherein said entity in determining its location, applies one or more route constraints for how the location data items passed to the mobile entity.

38. A method according to claim 37, wherein said entity in determining its location, applies a constraint that the said upper bound values are distances along predetermined routes from the known locations concerned.

39. A method according to claim 38, wherein said predetermined routes are routes on a map represented by map data known to the entity.

40. A method according to claim 37, wherein said entity in determining its location applies a constraint that the said upper bound values are distances along indeterminate routes that avoid particular zones.

41. A method according to claim 37, wherein a received location data item includes an indication of a constraint type to be applied over at least a certain length of the associated upper bound distance value.

42. A method according to claim 36, wherein upon said entity receiving a location data item indicating an upper bound distance value to a known location for which a location data item has been previously received, one of the location data items is discarded, the discarded item being the one indicating the larger upper bound distance value to the known location taking account of any increases due to movement of the entity after item receipt.

43. A method according to claim 36, wherein upon location determination by said entity initially indicating multiple location zones where the entity could be located, the entity seeks to determine which location zone is the most probable on the basis of one or more of the following probability indicators:
the size of the location zones as compared with an expected degree of location uncertainty;
the natures of the routes followed in order to arrive at the location zones from the known locations involved;
a previous history of locations visited or passed through by the entity;
the correspondence of sensed travel events, such as turning, with opportunities for such events along routes to the location zones.

44. A method according to claim 36, wherein the location of said entity is determined on two separate occasions with the later determination using location data received after the first determination whereby to enable an indication of the average direction of travel to be derived.

45. A method according to claim 36, wherein a best estimate of location is derived within an area of possible locations based on an averaging relative to vertices of that area.

46. A method according to claim 45, wherein said estimate is carried out by averaging of coordinate values of said vertices.

47. A method according to claim 45, wherein said estimate is carried out by finding the center of gravity of a polygon delimited by said vertices.

48. An entity comprising:
a short-range transceiver for exchanging, with currently-nearby entities, location data items that each specifies its originating location and includes a distance quantity indicative of an upper bound distance to its originating location;
a memory for storing received location data items;
an update arrangement for maintaining the received location data items by increasing the distance quantity of each location data item to take account of additional travel of the location data item as perceived by the entity; and
a control arrangement for causing the short-range transceiver to pass on to a newly encountered entity, previously-received location data items the distance quantities of which have been updated by the update arrangement.

49. An entity according to claim 48, wherein said entity is a mobile entity and the update arrangement is arranged to maintain the received location data items by increasing the distance quantity of the or each location data item by an amount corresponding to the distance moved by the entity whilst holding the location data item.

50. An entity according to claim 49, wherein the mobile entity is a vehicle equipped with a short-range transceiver and an odometer, the update arrangement being arranged to increase the distance quantity of the received location data items by the distance travelled by the vehicle as indicated by said odometer.

51. An entity according to claim 49, wherein the mobile entity is a mobile device intended to be carried by a pedestrian, the update arrangement being arranged to effect an estimate of the maximum distance likely to have been travelled by the pedestrian based on a speed value and elapsed time, and to increase the distance quantity of the received location data items by said estimate of the maximum distance likely to have been travelled by the pedestrian.

52. An entity according to claim 51, further comprising a location determining arrangement for effecting location determination by determining what locations are simultaneously consistent, or most nearly consistent, with the said upper bound distances known to the entity; the location determining arrangement being arranged to determine a maximum speed of the pedestrian based on the time taken for the pedestrian to move between locations determined by the location determination arrangement; the update arrangement being arranged to use this maximum speed as said speed value for estimating the maximum distance likely to have been travelled by the pedestrian.

53. An entity according to claim 51, further comprising a location determining arrangement for effecting location determination by determining what locations are simultaneously consistent, or most nearly consistent, with the said upper bound distances known to the entity; the update arrangement being arranged to use as said speed value a standard maximum speed for walking pedestrians; and the control arrangement being arranged to:
- monitor the current speed of the pedestrian based on the time taken for the pedestrian to move between locations of known position as determined by the location determining arrangement, and
- in the event of the current speed of the pedestrian exceeds said standard maximum speed, prevent the passing on of location data items from the mobile entity to other said entities by the short-range transceiver.

54. An entity according to claim 48, wherein the update arrangement is arranged to maintain the received location data items by increasing the distance quantity of a said location data item by an amount related to the transmission range of the transmitting entity in respect of one of receipt and transmission of the location data item by the subject entity.

55. An entity according to claim 54, wherein the update arrangement is arranged to increase the distance quantity of a location data item immediately prior to the entity transmitting that item to another entity, this increase being by a fixed transmission range value.

56. An entity according to claim 54, wherein the update arrangement is arranged to increase the distance quantity of a location data item received from another entity by a fraction of a range value for the transmitting entity, the update arrangement being arranged to determine this fraction in dependence on the received signal strength as measured by the short-range transceiver.

57. An entity according to claim 48, further comprising a location determining arrangement for effecting location determination by determining what locations are simultaneously consistent, or most nearly consistent, with the said upper bound distances known to the entity.

58. An entity according to claim 57, wherein the location determining arrangement is arranged, in determining the location of the entity, to apply one or more route constraints for how the location data items passed to the entity.

59. An entity according to claim 58, wherein the location determining arrangement is arranged, in determining the location of the entity, to apply a constraint that the said upper bound distances are distances along predetermined routes from the known locations concerned.

60. An entity according to claim 58, wherein the location determining arrangement is arranged, in determining the location of the entity, to apply a constraint that the said upper bound distances are distances along indeterminate routes that avoid particular zones.

61. An entity according to claim 57, wherein the location determining arrangement is arranged to derive a best estimate of location within an area of possible locations based on an averaging relative to vertices of that area.

62. A mobile entity provided with a location discovery system comprising:
- a short-range receiver for receiving location data items from currently nearby transmitting entities, each location data item specifying a known location and including a distance quantity indicative of an upper bound distance to that location;
- a memory for storing the received data items;
- a distance sub-system for measuring or estimating the distance travelled by the mobile entity;
- an update unit for updating the received data items by increasing the distance quantity of each data item by the distance measured or estimated by the distance sub-system since the item concerned was received or last updated; and
- a location determination unit operative to determine what locations are simultaneously consistent, or most nearly consistent, with the said upper bound distances known to the mobile entity.

63. An entity provided with a location discovery system comprising:
- a short-range receiver for receiving location data items from currently nearby transmitting entities, each location data item specifying a known location and including a distance quantity indicative of an upper bound distance to that location;
- a memory for storing the received data items;
- an update unit for updating the received data items by increasing the distance quantity of each data item by an amount related to the transmission range of the transmitting entity in respect of one of receipt and transmission of the location data item by the entity; and
- a location determination unit operative to determine what locations are simultaneously consistent, or most nearly consistent, with said upper bound distances known to the mobile entity.

64. A location discovery method wherein location data items originating at known locations are passed to, and diffused between, mobile entities by short-range communication, each location data item received by a mobile entity specifying a location and including a distance quantity indicative of a maximum distance of the entity from the specified location, and each mobile entity prior to using a location data item for location determination or transferring it to another mobile entity, increasing the maximum distance indicated by the distance quantity of the location data item to take account of movement of the mobile entity since receiving that item, the mobile entity effecting location determination by finding locations simultaneously consistent with the said maximum distances it knows of and any applicable route constraints for how the location data items passed to the mobile entity.

65. A location discovery method in which a mobile entity:
- receives location data items from currently-nearby transmitting entities, each location data item specifying a location and including a distance quantity indicative of a maximum distance to that location;
- maintains the received data items by increasing the distance quantity of each data item by the actual or estimated movement of the mobile entity; and
- effects location determination by determining what locations are simultaneously within all the said maximum distances known to the mobile entity and satisfy any other constraints applied by the mobile entity.

66. A method according to claim 65, wherein the mobile entity, on encountering another mobile entity, passes on its previously-received location data items to the other mobile entity, the distance quantities associated with these items having been increased to take account of the actual or estimated movement of the mobile entity passing them on.

67. A method according to claim 65, wherein the mobile entity is a vehicle equipped with a short-range transceiver and an odometer, the vehicle increasing the distance quantities of its location data items by the distance travelled by the vehicle as indicated by said odometer.

68. A method according to claim 66, wherein the mobile entity is a vehicle equipped with a short-range transceiver and an odometer, the vehicle increasing the distance quantities of its location data items by the distance travelled by the vehicle as indicated by said odometer.

69. A method according to claim 65, wherein the mobile entity is a pedestrian carrying a mobile device with a short-range transceiver, the device effecting an estimate of the maximum distance likely to have been travelled by the pedestrian based on a speed value and elapsed time, and the device increasing the distance quantities of its location data items by said estimate of the maximum distance likely to have been travelled by the pedestrian.

70. A method according to claim 66, wherein the mobile entity is a pedestrian carrying a mobile device with a short-range transceiver, the device effecting an estimate of the maximum distance likely to have been travelled by the pedestrian based on a speed value and elapsed time, and the device increasing the distance quantities of its location data items by said estimate of the maximum distance likely to have been travelled by the pedestrian.

71. A method according to claim 65, wherein the location determination operation applies a constraint that the said maximum distances are distances along predetermined routes from the specified locations concerned.

72. A method according to claim 65, wherein the location determination operation applies a constraint that the said maximum distances are distances along indeterminate routes that avoid particular zones.

73. A mobile entity provided with a location discovery system comprising:
- a short-range receiver for receiving location data items from currently nearby transmitting entities, each location data item specifying a location and including a distance quantity indicative of a maximum distance to that location;
- a memory for storing the received data items;
- a distance sub-system for measuring or estimating the distance travelled by the mobile entity;
- an update unit for updating the received data items by increasing the distance quantity associated with each data item by the distance measured or estimated by the distance sub-system since the item concerned was received or last updated; and
- a location determination unit operative to determine what locations are simultaneously within all the said maximum distances known to the mobile entity and satisfy and any other constraints applied by the mobile entity.

74. A method of disseminating location information, wherein location data, including a first component specifying a location and a second component indicative of the distance from the location specified by the first component, is passed between devices by short-range transceivers, said second component of the location data being increased, for each transmission hop between two devices, by an amount related to the transmission range of the transmitting device.

75. A method of disseminating location information wherein location data items originating at known locations are passed to, and diffused between, entities by short-range communication, each location data item specifying the said known location at which it originated and including a distance quantity indicative, without computational combination with the specified known location, of an upper bound value for the distance travelled by the location data item from the specified known location, said entities increasing the distance quantity of each location data item it handles to take account of additional travel of the location data item as perceived by the entity.

76. A method according to claim 1, wherein said distance quantity is indicative of an upper bound value for the distance travelled by the location data item from the specified known location, independently of the specified known location.

77. An entity according to claim 48, wherein the distance quantity included in each location data item and indicative of an upper bound distance to the originating location specified in the data item, is independent of the specified originating location.

78. An entity according to claim 62, wherein the distance quantity included in each location data item and indicative of an upper bound distance to the known location specified in the data item, is independent of the specified known location.

79. An entity according to claim 63, wherein the distance quantity included in each location data item and indicative of an upper bound distance to the known location specified in the data item, is independent of the specified known location.

80. A method according to claim 64, wherein the distance quantity included in each location data item and indicative of a maximum distance from the location specified in the data item, is independent of the specified location.

81. A method according to claim 65, wherein the distance quantity included in each location data item and indicative of a maximum distance to the location specified in the data item, is independent of the specified location.

82. An entity according to claim 73, wherein the distance quantity included in each location data item and indicative of a maximum distance to the location specified in the data item, is independent of the specified location.

83. A method according to claim 74, wherein the second component is indicative of the distance from the location specified by the first component, independently from the first component.

* * * * *